(12) United States Patent
Han et al.

(10) Patent No.: US 11,985,528 B2
(45) Date of Patent: May 14, 2024

(54) DATA TRANSMISSION METHOD AND DEVICE

(71) Applicant: ZTE Corporation, Shenzhen (CN)

(72) Inventors: Jiren Han, Shenzhen (CN); Zhuang Liu, Shenzhen (CN); Yin Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 565 days.

(21) Appl. No.: 17/279,746

(22) PCT Filed: Jul. 16, 2019

(86) PCT No.: PCT/CN2019/096229
§ 371 (c)(1),
(2) Date: Mar. 25, 2021

(87) PCT Pub. No.: WO2020/063050
PCT Pub. Date: Apr. 2, 2020

(65) Prior Publication Data
US 2022/0038932 A1 Feb. 3, 2022

(30) Foreign Application Priority Data
Sep. 28, 2018 (CN) .......................... 201811141908.9

(51) Int. Cl.
*H04W 88/02* (2009.01)
*H04W 4/02* (2018.01)
(Continued)

(52) U.S. Cl.
CPC ........... *H04W 24/10* (2013.01); *H04W 24/08* (2013.01); *H04W 92/12* (2013.01)

(58) Field of Classification Search
CPC ...... H04W 24/10; H04W 24/08; H04W 92/12
See application file for complete search history.

(56) References Cited

U.S. PATENT DOCUMENTS

2014/0126472 A1   5/2014  Siomina
2015/0092579 A1*  4/2015  Li ..................... H04W 24/10
                                              370/252
(Continued)

FOREIGN PATENT DOCUMENTS

CN    103364838 A   10/2013
CN    103634838 A    3/2014
(Continued)

OTHER PUBLICATIONS

3GPP TS 38.401, NG-RAN Architecture Description, 2017.
(Continued)

*Primary Examiner* — Moustapha Diaby
(74) *Attorney, Agent, or Firm* — CANTOR COLBURN LLP (57) ABSTRACT

A data transmission method includes: a communication node acquiring a layer 2 measurement value, and sending the layer 2 measurement value to a TCE. Another data transmission method includes: a DU acquiring a DU-side layer 2 measurement value, and sending the DU-side layer 2 measurement value to a CU or a TCE. Another data transmission method includes: a CU acquiring a DU-side layer 2 measurement value transmitted by a DU, and sending the DU-side layer 2 measurement value and a CU-side layer 2 measurement value to a TCE. Another data transmission method includes: a CU-UP acquiring a CU-UP-side layer 2 measurement value, and sending the CU-UP-side layer 2 measurement value to a CU-CP or a TCE. Another data transmission method includes: a CU-CP acquiring a CU-UP-side layer 2 measurement value transmitted by a CU-UP, and transmitting the CU-UP-side layer 2 measurement value to a TCE.

10 Claims, 7 Drawing Sheets

(51) Int. Cl.
H04W 24/08 (2009.01)
H04W 24/10 (2009.01)
H04W 88/06 (2009.01)
H04W 92/02 (2009.01)
H04W 92/12 (2009.01)

(56) References Cited

U.S. PATENT DOCUMENTS

2020/0374893 A1* 11/2020 Toeda .................... H04W 76/15
2021/0168653 A1* 6/2021 Arnold .............. H04W 28/0933

FOREIGN PATENT DOCUMENTS

| JP | 2018513652 A | 5/2018 |
| KR | 20170139540 A | 12/2017 |
| WO | 2017077039 A1 | 5/2017 |
| WO | 2018009340 A1 | 1/2018 |

OTHER PUBLICATIONS

3GPP TSG-SA5 Meeting #118, Beijing China Apr. 9, 2018, S5-182325.
Catt, "Stage 3TP for L2 measurements support in case of CU/DU split", 3GPP TSG RAN WG3 Meeting #96, May 15-19, 2017.
Chinese Office Action for corresponding application 201811141908. 9; Report dated May 10, 2022.
Chinese Search Report for corresponding application 201811141908. 9; Report dated May 10, 2022.
European Search Report for corresponding application EP 19866919; Report dated Jun. 9, 2022.
Japanese Office Action for Japanese Patent Application No. 2021-517385; dated Apr. 13, 2022.
Nokia Siemens Networks, "Alternative way for getting the IP address of TCE", 3GPP TSG SA5 (Telecom Management), Nov. 15-19, 2020.
ZTE, China Unicom, "Discussion on CU DU ID and NCGI", 3GPP TSG RAN WG3 NR Ad Hoc, Qingdao China, Jun. 27-29, R3-172417.
3rd Generation Partnership Project;Technical Specification Group Services and System Aspects; Study of Enablers for Network Automation for 5G3GPP TR 23.791 V1.0.0 (Sep. 2018).
Chinese Office Action for corresponding application 201811141908. 9; dated Feb. 25, 2023.
Chinese Search Report for corresponding application 201811141908. 9; dated Feb. 4, 2023.
Korean Office Action for corresponding application 10-2021-7012941; Report dated Nov. 10, 2022.
Nokia Siemens Networks, "Alternative way for getting the IP address of TCE", 3GPP TSG-SA5 (Telecom Management) SA5#74-OAM , Nov. 15-19, 2010; Jacksonville, USA, S5-103123.
CATT, "3GPP TSG-RAN WG3 Meeting #96, R3-171457", Discussion on L2 Measurements Support in Case of CU/DU Split, May 19, 2017.
CMCC., "3GPP TSG-RAN WG3 #103, R3-190569", Text Proposal for Network Aspects of MDT for NR, Mar. 1, 2019.
Ericsson., "3GPP TSG-SA5 Meeting #118, S5-182105", pCR 28.552 Add DL Packet DropUC and Measurements, Apr. 13, 2018.
International Search Report for corresponding application PCT/CN2019/096229 filed Jul. 16, 2019; dated Oct. 15, 2019.

* cited by examiner

DATA TRANSMISSION METHOD AND DEVICE

CROSS-REFERENCES TO RELATED APPLICATIONS

This application is a national stage application filed under 35 U.S.C. 371 based on International Patent Application No. PCT/CN2019/096229, filed on Jul. 16, 2019, which claims priority to Chinese Patent Application No. 201811141908.9 filed with the CNIPA on Sep. 28, 2018, the content of which is incorporated herein by reference in their entirety.

TECHNICAL FIELD

The present application relates to, but is not limited to, the field of communications, for example, relates to, but is not limited to, a data transmission method and apparatus.

BACKGROUND

In communication technologies, drive test can reflect the status of a mobile communication network, directly measure and evaluate network performance indicators, and point out problems of the network. For operators, the drive test is an important means for network optimization. In a traditional drive testing method, an operator or a third-party company is required to test an area to be monitored and optimized, specifically, collect network data such as signal level and quality by means of drive test instruments, and analyze the data, so as to discover problems of the network. This method usually requires a lot of manpower, material resources and financial investment, and also imposes very high experience requirements on network optimization personnel.

A minimization of drive tests (MDT) technology is mainly to acquire relevant parameters such as a layer 2 measurement value required for network optimization through a measurement report reported by a terminal device, so as to reach the goal of reducing the network optimization and maintenance costs of the operator. Compared with traditional drive tests, MDT can save energy and reduce emissions, reduce drive test costs, shorten an optimization cycle, and bring higher user satisfaction. Moreover, the MDT can collect measurement information of a whole area (such as narrow roads, forests, and private places) that cannot be obtained through the traditional drive tests.

The MDT include following functions: automatically collecting measurement information such as the layer 2 measurement value by means of a user equipment (UE); reporting the measurement information to a radio access network (RAN) via control plane signaling, where the RAN may correspond to an evolved NodeB (eNB) in an Evolved UMTS Terrestrial Radio Access Network (E-UTRAN) and a next generation NodeB (gNB) in an NR system; and reporting the measurement information to a trace collection entity (TCE) through the RAN. The MDT is used for network optimization, for example, finding and solving a network coverage problem.

According to the state where the UE is when performing the MDT, the MDT may be classified into following modes: logged MDT and immediate MDT. In the logged MDT mode, the UE performs recording and measurement in a Radio Resource Control (RRC) idle state. In the immediate MDT mode, the UE performs measurement and reporting in an RRC connected state. The MDT configuration information required for the UE to perform the MDT includes an area scope, trace reference, a measurement type to be performed by the UE, an IP address of the TCE, etc.

In the fifth generation of mobile communications (5G), a base station may be divided into two parts: a central unit (CU) and a distributed unit (DU). One base station includes one CU and may include multiple DUs, which is referred to as CU/DU split. An interface between the CU and the DU is referred to as an F1 interface. The CU may be divided into a CU control plane (CU-CP) and a CU user plane (CU-UP). One CU includes one CP and may include multiple UPs, which is referred to as CP/UP split. An interface between the CP and the UP is referred to as an E1 interface. In New Radio scenarios such as 5G in the related art, the terminal device cannot report the layer 2 measurement value.

SUMMARY

The embodiments of the present application provide a data transmission method and apparatus.

According to an embodiment of the present application, a data transmission method includes steps described below. A communication node acquires a layer 2 measurement value. The communication node sends the layer 2 measurement value to a trace collection entity (TCE).

According to another embodiment of the present application, a data transmission method is further provided and includes steps described below. A distributed unit (DU) acquires a DU-side layer 2 measurement value. The DU sends the DU-side layer 2 measurement value to a central unit (CU) or directly to a trace collection entity (TCE).

According to another embodiment of the present application, a data transmission method includes steps described below. A central unit (CU) acquires a DU-side layer 2 measurement value transmitted by a distributed unit (DU). The CU transmits the DU-side layer 2 measurement value and a CU-side layer 2 measurement value to a trace collection entity (TCE).

According to yet another embodiment of the present application, a data transmission method includes steps described below. A central unit user plane (CU-UP) acquires a CU-UP-side layer 2 measurement value. The CU-UP sends the CU-UP-side layer 2 measurement value to a central unit control plane (CU-CP) or directly to a trace collection entity (TCE).

According to still another embodiment of the present application, a data transmission method includes steps described below. A central unit control plane (CU-CP) acquires a CU-UP-side layer 2 measurement value transmitted by a CU-UP. The CU-CP transmits the CU-UP-side layer 2 measurement value to a trace collection entity (TCE).

According to an embodiment of the present application, a data transmission apparatus, applied to a communication node, includes a first acquisition module and a first sending module. The first acquisition module is configured to acquire a layer 2 measurement value. The first sending module is configured to send the layer 2 measurement value to a trace collection entity (TCE).

According to another embodiment of the present application, a data transmission apparatus, applied to a distributed unit (DU), includes a second acquisition module and a second sending module. The second acquisition module is configured to acquire a DU-side layer 2 measurement value. The second sending module is configured to send the DU-side layer 2 measurement value to a central unit (CU) or directly to a trace collection entity (TCE).

According to yet another embodiment of the present application, a data transmission apparatus, applied to a central unit, includes a third acquisition module and a third sending module. The third acquisition module is configured to acquire a DU-side layer 2 measurement value transmitted by a distributed unit (DU). The third sending module is configured to transmit the DU-side layer 2 measurement value and a CU-side layer 2 measurement value to a trace collection entity (TCE).

According to still another embodiment of the present application, a data transmission apparatus, applied to a central unit user plane (CU-UP), includes a fourth acquisition module and a fourth sending module. The fourth acquisition module is configured to acquire a CU-UP-side layer 2 measurement value. The fourth sending module is configured to send the CU-UP-side layer 2 measurement value to a central unit control plane (CU-CP) or directly to a trace collection entity (TCE).

According to another embodiment of the present application, a data transmission apparatus, applied to a central unit control plane (CU-CP), includes a fifth acquisition module and a fifth sending module. The fifth acquisition module is configured to acquire a CU-UP-side layer 2 measurement value transmitted by a central unit user plane (CU-UP). The fifth sending module is configured to transmit the CU-UP-side layer 2 measurement value to a trace collection entity (TCE).

An embodiment of the present application further provides a storage medium. The storage medium stores a computer program, where any one of the data transmission methods described above is performed when the computer program is executed.

According to yet another embodiment of the present application, an electronic apparatus includes a memory and a processor, where the memory stores a computer program, and the processor is configured to execute the computer program to perform any one of the data transmission methods described above.

DETAILED DESCRIPTION

Hereinafter, the present application will be described in detail with reference to drawings and in conjunction with embodiments.

The embodiments of the present application provide a mobile communication network (which includes, but is not limited to, a 5G mobile communication network). The network architecture of the mobile communication network may include a network-side device (such as a base station) and a terminal (including a mobile terminal). The embodiments of the present application provide at least a data transmission method executable on the preceding network architecture.

Figure 1:
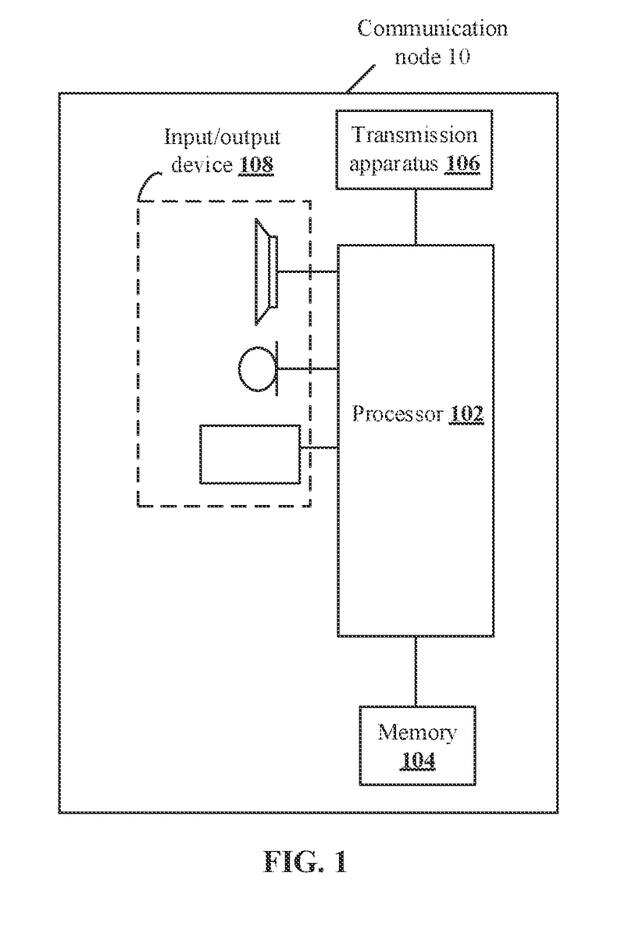
FIG. 1 is a block diagram illustrating a hardware structure of a mobile terminal.

Method embodiments provided by the embodiments of the present application may be performed in a communication node or a similar computing apparatus. In an example in which the method embodiments are performed in the communication node, as shown in FIG. 1, the communication node 10 may include one or more (only one is shown in FIG. 1) processors 102 (the processor 102 may include, but are not limited to, a microcontroller unit (MCU), a field programmable gate array (FPGA) and other processing apparatuses) and a memory 104 configured to store data. The preceding communication node may further include a transmission apparatus 106 for a communication function and an input/output device 108. It is understandable by those skilled in the art that the structure shown in FIG. 1 is merely illustrative and not intended to limit the structure of the preceding communication node. For example, the communication node 10 may further include more or fewer components than the components shown in FIG. 1 or has a configuration different from the configuration shown in FIG. 1.

The memory 104 may be configured to store software programs and modules of application software, such as program instructions/modules corresponding to the data transmission method in the embodiments of the present application. The processor 102 executes the software programs and modules stored in the memory 104 to perform various functional applications and data processing, that is, to implement the data transmission method described above. The memory 104 may include a high-speed random-access memory and may further include a nonvolatile memory such as one or more magnetic storage apparatuses, flash memories, or other nonvolatile solid-state memories. In some examples, the memory 104 may include memories which are remotely disposed with respect to the processor 102 and these remote memories may be connected to the communication node 10 via a network. The examples of the preceding network include, but are not limited to, the Internet, an intranet, a local area network, a mobile communication network, and a combination thereof.

The transmission apparatus 106 is configured to receive or send data via a network. An example of the preceding network may include a wireless network provided by a communication provider of the communication node 10. In an example, the transmission apparatus 106 includes a network interface controller (NIC) which may be connected to another network device via a base station and thus communicate with the Internet. In an example, the transmission apparatus 106 may be a radio frequency (RF) module configured to wirelessly communicate with the Internet.

Embodiment One

Figure 2:
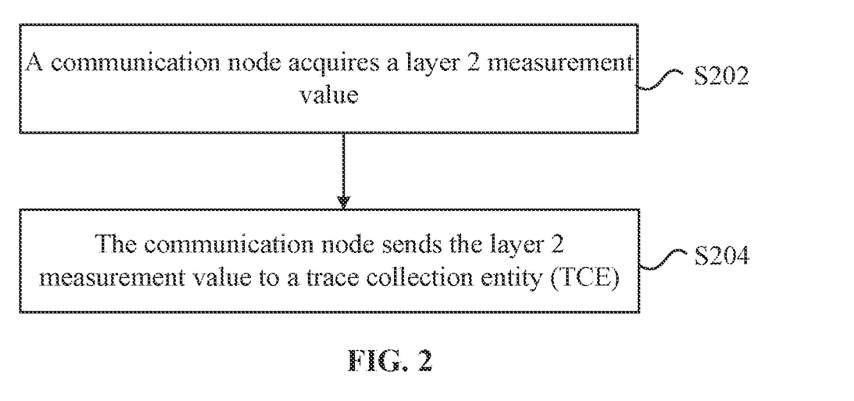
FIG. 2 is a flowchart of a data transmission method according to an embodiment of the present application.

This embodiment provides a data transmission method executed in the communication node described above. FIG. 2 is a flowchart of a data transmission method according to an embodiment of the present application. As shown in FIG. 2, the method includes steps described below.

In step S202, a communication node acquires a layer 2 measurement value.

The preceding communication node may be a base station. Layer 2 refers to layer 2 in a communication system and includes a Packet Data Convergence Protocol (PDCP), a radio link control (RLC) protocol, and a media access control (MAC) protocol. The layer 2 measurement value is a measurement value to be processed in layer 2 and may include the following parameters of layer 2: uplink and downlink packet loss rates, an interface delay, an air interface delay, uplink and downlink physical resource block (PRB) usage, the number of Radio Resource Control (RRC) connections, and uplink and downlink UE throughput.

In step S204, the communication node sends the layer 2 measurement value to a trace collection entity (TCE).

Through the preceding steps, the communication node acquires the layer 2 measurement value and reports the layer 2 measurement value to the TCE, which solves the problem in the related art of a lack of a layer 2 measurement data reporting solution applicable to New Radio and provides a method for reporting the layer 2 measurement value applicable to New Radio.

In an embodiment, the preceding steps may be executed by the base station or the like.

In an embodiment, the step in which the communication node acquires the layer 2 measurement value includes at least one of steps described below. A central unit (CU) of the communication node acquires a DU-side layer 2 measurement value reported by a distributed unit (DU). A CU control plane (CU-CP) of the communication node acquires a CU-UP-side layer 2 measurement value reported by a CU user plane (CU-UP).

In an embodiment, the method further includes at least one of steps described below. The CU of the communication node receives, through an F1 interface, the DU-side layer 2 measurement value reported by the DU. The CU-CP of the communication node receives, through an E1 interface, the CU-UP-side layer 2 measurement value reported by the CU-UP.

In an embodiment, the step in which the communication node sends the layer 2 measurement value to the trace collection entity (TCE) includes one of steps described below. The CU of the communication node acquires the DU-side layer 2 measurement value reported by the DU, and after acquiring the DU-side layer 2 measurement value, reports the DU-side layer 2 measurement value and a CU-side layer 2 measurement value to the TCE. The CU of the communication node reports the CU-side layer 2 measurement value to the TCE, and the DU of the communication node directly reports the DU-side layer 2 measurement value to the TCE.

In an embodiment, before the DU of the communication node reports the DU-side layer 2 measurement value to the TCE, the method further includes at least one of steps described below. The DU acquires an IP address of the TCE from the CU via F1 interface signaling. The DU acquires the IP address of the TCE from OAM.

In an embodiment, the step in which the communication node sends the layer 2 measurement value to the trace collection entity (TCE) includes one of steps described below. The CU-CP of the communication node acquires the CU-UP-side layer 2 measurement value, and after acquiring the CU-UP-side layer 2 measurement value, reports the acquired CU-UP-side layer 2 measurement value to the TCE. The CU-UP of the communication node directly reports the CU-UP-side layer 2 measurement value to the TCE.

In an embodiment, before the CU-UP of the communication node reports the CU-UP-side layer 2 measurement value to the TCE, the CU-UP acquires the IP address of the TCE from the CU-CP via E1 interface signaling; or the CU-UP acquires the IP address of the TCE from the OAM.

In an embodiment, the layer 2 measurement value includes at least one of: the uplink and downlink packet loss rates, the interface delay, the air interface delay, the uplink and downlink PRB usage, the number of RRC connections, or the uplink and downlink UE throughput.

In an embodiment, before the communication node sends the layer 2 measurement value to the trace collection entity (TCE), the communication node acquires the IP address of the TCE from the OAM.

Embodiment Two

According to another embodiment of the present application, a data transmission method is further provided and includes steps described below.

In step one, a distributed unit (DU) acquires a DU-side layer 2 measurement value.

In step two, the DU sends the DU-side layer 2 measurement value to a central unit (CU) or directly to a trace collection entity (TCE).

With the preceding solution, the distributed unit (DU) of a communication node acquires the DU-side layer 2 measurement value and reports the DU-side layer 2 measurement value to the central unit (CU) or the TCE, which solves the problem in the related art of a lack of a layer 2 measurement data reporting solution applicable to New Radio and provides a method for reporting the layer 2 measurement value applicable to New Radio.

In an embodiment, when the DU sends the DU-side layer 2 measurement value to the TCE, the CU also reports a CU-side layer 2 measurement value to the TCE.

In an embodiment, the step in which the DU sends the DU-side layer 2 measurement value to the CU includes that the DU sends the DU-side layer 2 measurement value to the CU through an F1 interface.

In an embodiment, before the DU sends the DU-side layer 2 measurement value to the TCE, the method includes one of the following steps: the DU acquires an IP address of the TCE from the CU, or the DU acquires the IP address of the TCE from OAM.

Embodiment Three

According to another embodiment of the present application, a data transmission method is further provided and includes steps described below.

In step one, a central unit (CU) acquires a DU-side layer 2 measurement value transmitted by a distributed unit (DU).

In step two, the CU transmits the DU-side layer 2 measurement value and a CU-side layer 2 measurement value to a trace collection entity (TCE).

With the preceding solution, the CU of a communication node acquires the DU-side layer 2 measurement value transmitted by the DU and reports the DU-side layer 2 measurement value and the CU-side layer 2 measurement value together to the TCE, which solves the problem in the related art of a lack of a layer 2 measurement data reporting solution applicable to New Radio and provides a method for reporting the layer 2 measurement value applicable to New Radio.

According to another embodiment of the present application, a data transmission method is further provided and includes steps described below.

In step one, a central unit user plane (CU-UP) acquires a CU-UP-side layer 2 measurement value.

In step two, the CU-UP sends the CU-UP-side layer 2 measurement value to a central unit control plane (CU-CP) or directly a trace collection entity (TCE).

With the preceding solution, in the case of CP/UP split of the central unit, the user plane acquires its own CU-UP-side layer 2 measurement value and sends the CU-UP-side layer 2 measurement value to the control plane (CP) or directly to the TCE, which solves the problem in the related art of a lack of a layer 2 measurement data reporting solution applicable to New Radio and provides a method for reporting the layer 2 measurement value applicable to New Radio.

The preceding solution is used for describing a solution in the case of CP/UP split of the central unit, and the relationship of CU/DU split is not limited here. The CP/UP split and the CU/DU split may exist at the same time.

In an embodiment, the step in which the CU-UP sends the CU-UP-side layer 2 measurement value to the CU-CP includes that the CU-UP sends the CU-UP-side layer 2 measurement value to the CU-CP through an E1 interface.

In an embodiment, before the CU-UP sends the CU-UP-side layer 2 measurement value to the TCE, the method further includes one of steps described below. The CU-UP acquires an IP address of the TCE from the CU-CP. The CU-UP acquires the IP address of the TCE from OAM.

Embodiment Four

According to another embodiment of the present application, a data transmission method is further provided and includes steps described below.

In step one, a central unit control plane (CU-CP) acquires a CU-UP-side layer 2 measurement value transmitted by a central unit user plane (CU-UP).

In step two, the CU-CP transmits the CU-UP-side layer 2 measurement value to a trace collection entity (TCE).

With the preceding solution, in the case of CP/UP split of the central unit, the control plane acquires the CU-UP-side layer 2 measurement value from the user plane and sends the CU-UP-side layer 2 measurement value to the TCE, which solves the problem in the related art of a lack of a layer 2 measurement data reporting solution applicable to New Radio and provides a method for reporting the layer 2 measurement value applicable to New Radio.

The present application will be described below in conjunction with embodiments.

In related communications, in the scenarios of CU/DU split and CP/UP split, a method for transmitting and reporting layer 2 measurement data on a base station side has not been expressly defined.

Embodiment 1

Figure 3:
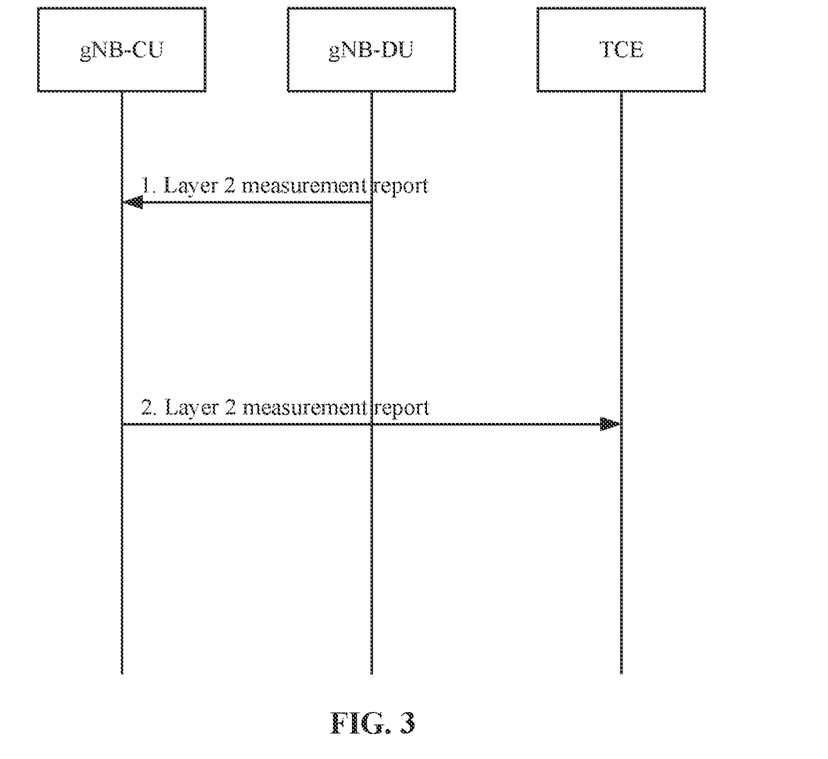
FIG. 3 is a schematic diagram illustrating that a gNB-CU uniformly reports layer 2 measurement reports according to embodiment 1 of the present application.

FIG. 3 is a schematic diagram illustrating that a gNB-CU uniformly reports layer 2 measurement reports according to embodiment 1 of the present application. As shown in FIG. 3, the process includes steps described below.

In step 1, a gNB-DU reports layer 2 measurement data collected by the gNB-DU to a gNB-CU through a measurement report.

In step 2, the gNB-CU integrates layer 2 measurement data collected by the gNB-CU and the layer 2 measurement data reported by the gNB-DU, and reports the integrated layer 2 measurement data to a TCE through a measurement report.

Embodiment 2

Figure 4:
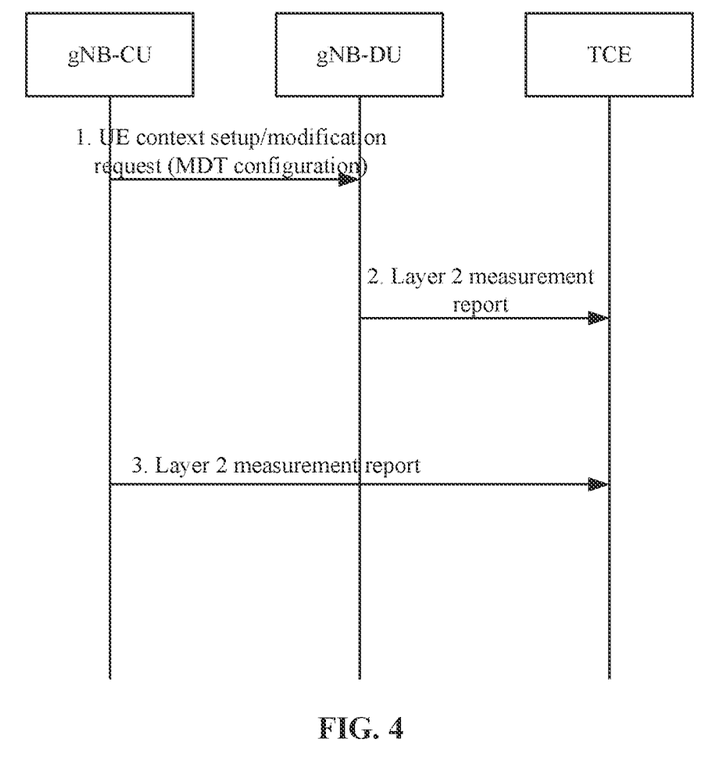
FIG. 4 is a schematic diagram illustrating that a CU and a DU separately report layer 2 measurement reports according to embodiment 2 of the present application.

FIG. 4 is a schematic diagram illustrating that a CU and a DU separately report layer 2 measurement reports according to embodiment 2 of the present application. As shown in FIG. 4, the process includes steps described below.

In step 1, a gNB-CU sends an MDT configuration including an IP address of a TCE to a gNB-DU through a UE context setup request message or a UE context modification request message.

In step 2, after receiving the IP address of the TCE, the gNB-DU directly reports layer 2 measurement data collected at the gNB-DU side to the TCE through a layer 2 measurement report.

In step 3, the gNB-CU reports layer 2 measurement data collected at the gNB-CU side to the TCE through a layer 2 measurement report.

Embodiment 3

Figure 5:
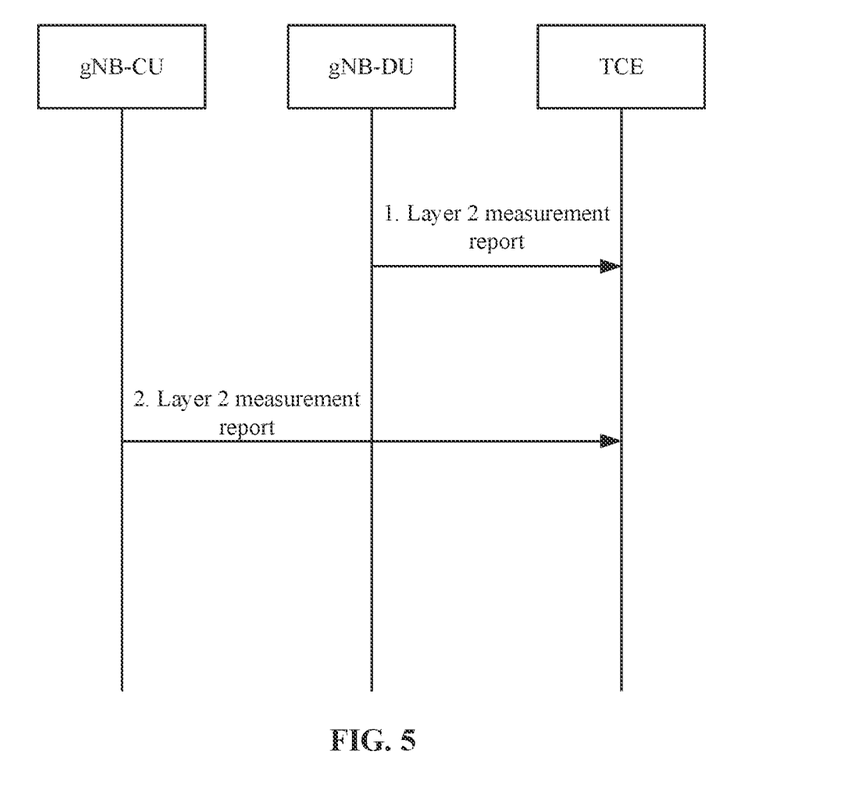
FIG. 5 is a schematic diagram illustrating that a CU and a DU separately report layer 2 measurement reports after a gNB-DU acquires an IP address of a TCE from OAM according to embodiment 3 of the present application.

FIG. 5 is a schematic diagram illustrating that a gNB-CU and a gNB-DU separately report layer 2 measurement reports after the gNB-DU acquires an IP address of a TCE from OAM according to embodiment 3 of the present application. As shown in FIG. 5, the process includes steps described below.

In step 1, after the gNB-DU acquires the IP address of the TCE from the OAM, the gNB-DU may directly report layer 2 measurement data collected at the gNB-DU side to the TCE through a layer 2 measurement report.

In step 2, the gNB-CU reports layer 2 measurement data collected at the gNB-CU side to the TCE through a layer 2 measurement report.

Embodiment 4

Figure 6:
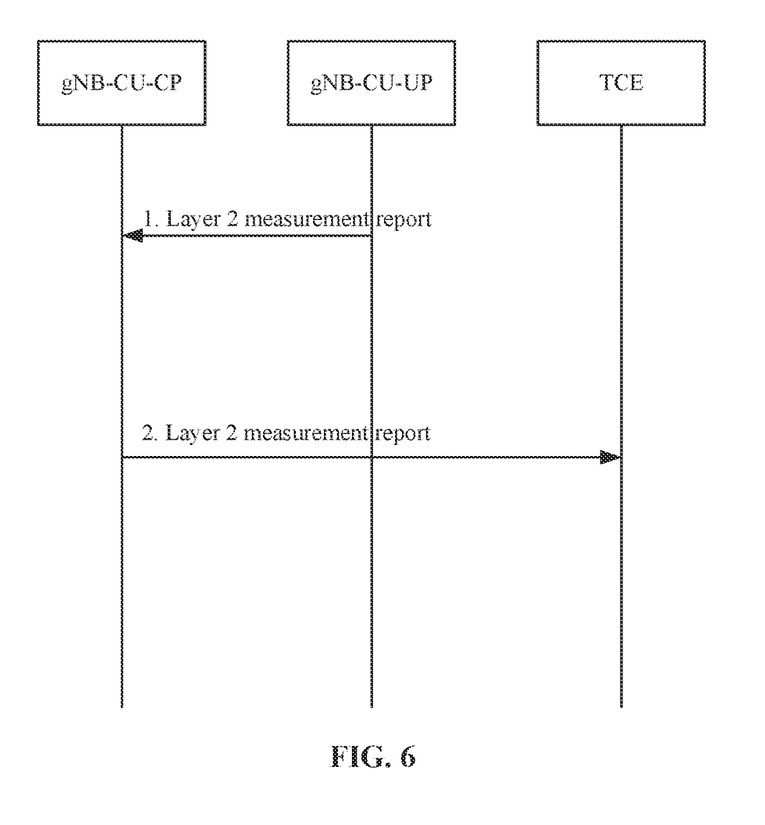
FIG. 6 is a schematic diagram illustrating that a gNB-CU-CP reports a layer 2 measurement report according to embodiment 4 of the present application.

FIG. 6 is a schematic diagram illustrating that a gNB-CU-CP reports a layer 2 measurement report according to embodiment 4 of the present application. As shown in FIG. 6, the process includes steps described below.

In step 1, a gNB-CU-UP reports layer 2 measurement data collected by the gNB-CU-UP to the gNB-CU-CP through a measurement report.

In step 2, the gNB-CU-CP reports the obtained layer 2 measurement data to a TCE through the measurement report.

Embodiment 5

Figure 7:
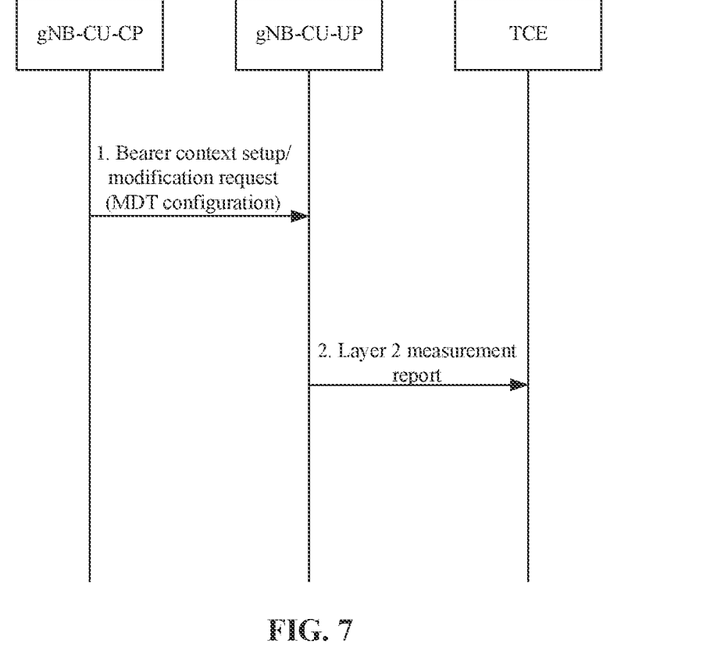
FIG. 7 is a schematic diagram illustrating that a CU-UP directly reports a layer 2 measurement report after a gNB-CU-UP acquires an MDT configuration from a gNB-CU-CP according to embodiment 5 of the present application.

FIG. 7 is a schematic diagram illustrating that a gNB-CU-UP directly reports a layer 2 measurement report after the gNB-CU-UP acquires an MDT configuration from a gNB-CU-CP according to embodiment 5 of the present application. As shown in FIG. 7, the process includes steps described below.

In step 1, the gNB-CU-CP sends the MDT configuration including an IP address of a TCE to the gNB-CU-UP through a bearer context setup request message or a bearer context modification request message.

In step 2, after receiving the IP address of the TCE, the gNB-CU-UP directly reports layer 2 measurement data collected at the gNB-CU-UP side to the TCE through the layer 2 measurement report.

Embodiment 6

Figure 8:
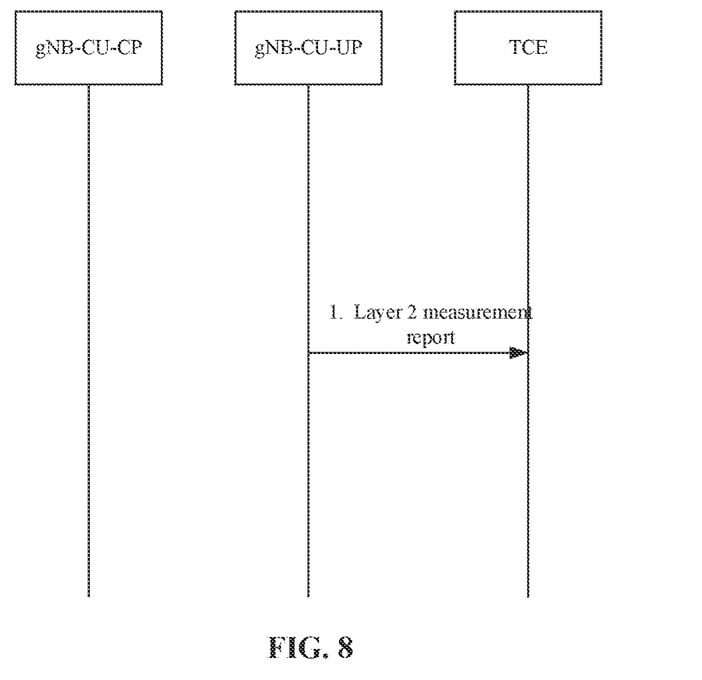
FIG. 8 is a schematic diagram illustrating that a CU-UP directly reports a layer 2 measurement report after a gNB-CU-UP acquires an IP address of a TCE from OAM according to embodiment 6 of the present application.

FIG. 8 is a schematic diagram illustrating that a gNB-CU-UP directly reports a layer 2 measurement report after the gNB-CU-UP acquires an IP address of a TCE from OAM according to embodiment 6 of the present application. As shown in FIG. 8, the process includes a step described below.

In step 1, after the gNB-CU-UP acquires the IP address of the TCE from the OAM, the gNB-CU-UP may directly report layer 2 measurement data collected at the gNB-CU-UP side to the TCE through the layer 2 measurement report.

The method for transmitting and reporting layer 2 measurement data provided by the present application, in the case of CU/DU split and CP/UP split, can specify a manner for transmitting and reporting the layer 2 measurement data between different entities and fill a gap in the related field.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation. Based on such an understanding, the solutions of the present application substantially, or the part contributing to the existing art, may be embodied in the form of a software product. The computer software product is stored on a storage medium (such as a ROM/RAM, a magnetic disk, or an optical disk) and includes one or more instructions to enable a terminal device (which may be a mobile phone, a computer, a server, or a network device) to perform the method according to any one of the embodiments of the present application.

Embodiment Five

This embodiment further provides a data transmission apparatus for implementing the embodiments described above. As used below, the term "module" may be software, hardware, or a combination thereof capable of implementing predetermined functions.

Another embodiment of the present application further provides a data transmission apparatus applied to a communication node and including an acquisition module and a sending module. The acquisition module may be a first acquisition module, and the sending module may be a first sending module.

The first acquisition module is configured to acquire a layer 2 measurement value.

The first sending module is configured to send the layer 2 measurement value to a trace collection entity (TCE).

Through the preceding steps, the communication node acquires the layer 2 measurement value and reports the layer 2 measurement value to the TCE, which solves the problem in the related art of a lack of a layer 2 measurement data reporting solution applicable to New Radio and provides a method for reporting the layer 2 measurement value applicable to New Radio.

Another embodiment of the present application further provides a data transmission apparatus applied to a distributed unit (DU) and including an acquisition module and a sending module. The acquisition module may be a second acquisition module, and the sending module may be a second sending module.

The second acquisition module is configured to acquire a DU-side layer 2 measurement value.

The second sending module is configured to send the DU-side layer 2 measurement value to a central unit (CU) or directly to a trace collection entity (TCE).

With the preceding solution, the distributed unit (DU) of a communication node acquires the DU-side layer 2 measurement value and reports the DU-side layer 2 measurement value to the central unit (CU) or the TCE, which solves the problem in the related art of a lack of a layer 2 measurement data reporting solution applicable to New Radio and provides a method for reporting the layer 2 measurement value applicable to New Radio.

Another embodiment of the present application further provides a data transmission apparatus applied to a central unit and including an acquisition module and a sending module. The acquisition module may be a third acquisition module, and the sending module may be a third sending module.

The third acquisition module is configured to acquire a DU-side layer 2 measurement value transmitted by a distributed unit (DU).

The third sending module is configured to transmit the DU-side layer 2 measurement value and a CU-side layer 2 measurement value to a trace collection entity (TCE).

With the preceding solution, the CU of a communication node acquires the DU-side layer 2 measurement value transmitted by the DU and reports the DU-side layer 2 measurement value and the CU-side layer 2 measurement value together to the TCE, which solves the problem in the related art of a lack of a layer 2 measurement data reporting solution applicable to New Radio and provides a method for reporting the layer 2 measurement value applicable to New Radio.

Another embodiment of the present application further provides a data transmission apparatus applied to a central unit user plane (CU-UP) and including an acquisition module and a sending module. The acquisition module may be a fourth acquisition module, and the sending module may be a fourth sending module.

The fourth acquisition module is configured to acquire a CU-UP-side layer 2 measurement value.

The fourth sending module is configured to send the CU-UP-side layer 2 measurement value to a central unit control plane (CU-CP) or directly to a trace collection entity (TCE).

With the preceding solution, in the case of CP/UP split of the central unit, the user plane acquires its CU-UP-side layer 2 measurement value and sends the CU-UP-side layer 2 measurement value to the control plane (CP) or directly sends the CU-UP-side layer 2 measurement value to the TCE, which solves the problem in the related art of a lack of a layer 2 measurement data reporting solution applicable to New Radio and provides a method for reporting the layer 2 measurement value applicable to New Radio.

Another embodiment of the present application further provides a data transmission apparatus applied to a central unit control plane (CU-CP) and including an acquisition module and a sending module. The acquisition module may be a fifth acquisition module, and the sending module may be a fifth sending module.

The fifth acquisition module is configured to acquire a CU-UP-side layer 2 measurement value transmitted by a central unit user plane (CU-UP).

The fifth sending module is configured to send the CU-UP-side layer 2 measurement value to a trace collection entity (TCE).

With the preceding solution, in the case of CP/UP split of the central unit, the control plane acquires the CU-UP-side layer 2 measurement value from the user plane and sends the CU-UP-side layer 2 measurement value and a CU-CP-side layer 2 measurement value together to the TCE, which solves the problem in the related art of a lack of a layer 2 measurement data reporting solution applicable to New Radio and provides a method for reporting the layer 2 measurement value applicable to New Radio.

It is to be noted that each module described above may be implemented by software or hardware. Implementation by hardware may, but may not necessarily, be performed in the following manners: the modules described above are located in a same processor, or each module described above is located in a respective processor in any combination form.

Embodiment Six

An embodiment of the present application further provides a storage medium. In this embodiment, the storage medium may be configured to store program codes for executing any one of the data transmission methods described above.

In an embodiment, the program codes stored in the storage medium, when executed, may implement steps described below.

In S1, a communication node acquires a layer 2 measurement value.

In S2, the communication node sends the layer 2 measurement value to a trace collection entity (TCE).

In this embodiment, the storage medium may include, but is not limited to, a USB flash disk, a read-only memory (ROM), a random access memory (RAM), a mobile hard disk, a magnetic disk, an optical disk, or other media capable of storing program codes.

An embodiment of the present application further provides an electronic apparatus including a memory and a processor, where the memory stores a computer program, and the processor is configured to execute the computer program to perform any one of the data transmission methods described above.

In an embodiment, the electronic apparatus may further include a transmission apparatus and an input/output device. The transmission apparatus is connected to the processor. The input/output device is connected to the processor.

In this embodiment, the processor may be configured to perform steps described below through the computer program.

In S1, a communication node acquires a layer 2 measurement value.

In S2, the communication node sends the layer 2 measurement value to a trace collection entity (TCE).

For examples in this embodiment, reference may be made to the examples described in any one of the embodiments described above.

It should be understood by those skilled in the art that each of the above-mentioned modules or steps of the present application may be implemented by a general-purpose computing apparatus, the modules or steps may be concentrated on a single computing apparatus or distributed on a network composed of multiple computing apparatuses, and the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any particular combination of hardware and software.

What is claimed is:

1. A data transmission method, comprising:
    acquiring, by a communication node, a layer 2 measurement value; and
    sending, by the communication node, the layer 2 measurement value to a trace collection entity (TCE);
    wherein sending, by the communication node, the layer 2 measurement value to the TCE comprises: reporting, by a CU of the communication node, a CU-side layer 2 measurement value to the TCE, and directly reporting, by a DU of the communication node, a DU-side layer 2 measurement value to the TCE; and before directly reporting, by the DU of the communication node, the DU-side layer 2 measurement value to the TCE, the method further comprises: acquiring, by the DU, an Internet Protocol (IP) address of the TCE from the CU via F1 interface signaling; or
    wherein sending, by the communication node, the layer 2 measurement value to the TCE comprises: directly reporting, by a CU-UP of the communication node, a CU-UP-side layer 2 measurement value to the TCE; and before directly reporting, by the CU-UP of the communication node, the CU-UP-side layer 2 measurement value to the TCE, the method further comprises: acquiring, by the CU-UP, an IP address of the TCE from the CU-CP via E1 interface signaling.

2. A non-transitory storage medium, which stores a computer program, wherein the computer program is configured to, when executed, perform the method of claim 1.

3. An electronic apparatus, comprising a memory and a processor, wherein the memory stores a computer program, and the processor is configured to execute the computer program to perform the method of claim 1.

4. A data transmission method, comprising:
    acquiring, by a distributed unit (DU), a DU-side layer 2 measurement value; and
    directly sending, by the DU, the DU-side layer 2 measurement value to a trace collection entity (TCE);
    wherein before directly sending, by the DU, the DU-side layer 2 measurement value to the TCE, the method further comprises:
    acquiring, by the DU, an Internet Protocol (IP) address of the TCE from the CU.

5. An electronic apparatus, comprising a memory and a processor, wherein the memory stores a computer program, and the processor is configured to execute the computer program to perform the method of claim 4.

6. A non-transitory storage medium, which stores a computer program, wherein the computer program is configured to, when executed, perform the method of claim 4.

7. A data transmission method, comprising:
    acquiring, by a central unit user plane (CU-UP), a CU-UP-side layer 2 measurement value; and
    directly sending, by the CU-UP, the CU-UP-side layer 2 measurement value to a trace collection entity (TCE).

8. The method of claim 7, before directly sending, by the CU-UP, the CU-UP-side layer 2 measurement value to the TCE, further comprising:
    acquiring, by the CU-UP, an Internet Protocol (IP) address of the TCE from the CU-CP.

9. An electronic apparatus, comprising a memory and a processor, wherein the memory stores a computer program, and the processor is configured to execute the computer program to perform the method of claim 7.

10. The electronic apparatus of claim 9, wherein the processor is configured to execute the computer program to further perform, before directly sending, by the CU-UP, the CU-UP-side layer 2 measurement value to the TCE, the following step:
   acquiring, by the CU-UP, an Internet Protocol (IP) address of the TCE from the CU-CP.

* * * * *